United States Patent
Rossignol

(10) Patent No.: US 7,203,592 B2
(45) Date of Patent: *Apr. 10, 2007

(54) METHOD FOR DETECTING FAILED COMBUSTION IN AN INTERNAL COMBUSTION ENGINE BY A COMBINATION OF COMBUSTION IRREGULARITY INDICES

(75) Inventor: Alain Rossignol, Toulouse (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/546,534

(22) PCT Filed: Feb. 11, 2004

(86) PCT No.: PCT/EP2004/001249

§ 371 (c)(1),
(2), (4) Date: Aug. 22, 2005

(87) PCT Pub. No.: WO2004/074806

PCT Pub. Date: Sep. 2, 2004

(65) Prior Publication Data

US 2006/0167614 A1      Jul. 27, 2006

(30) Foreign Application Priority Data

Feb. 20, 2003   (FR) .................................. 03 02056

(51) Int. Cl.
*G06F 17/00* (2006.01)
(52) U.S. Cl. ..................................... 701/111
(58) Field of Classification Search ................ 701/111, 701/110, 102, 101, 114, 115; 73/116, 117.3, 73/118.1
See application file for complete search history.

(56) References Cited

U.S. PATENT DOCUMENTS

| 5,505,079 A | 4/1996 | Rossignol |
| 5,708,200 A | 1/1998 | Rossignol |
| 5,747,681 A | 5/1998 | Kuroda et al. |
| 5,821,412 A | 10/1998 | Mathias |

(Continued)

FOREIGN PATENT DOCUMENTS

EP      1 058 107      12/2000

(Continued)

*Primary Examiner*—Hieu T. Vo
(74) *Attorney, Agent, or Firm*—Young & Thompson

(57) ABSTRACT

Method for detecting misfires of a mixture between a fuel oxidizing agent, in any one of the cylinders of an and an internal combustion engine, by the following steps:

a) during at least some of the phases of combustion in at least one of the cylinders, a current value, at an instant (t) of operation of the engine, of an index I(t) representative of operational irregularities in the engine stroke is calculated, b) while the engine is operating, and on the basis of the current value, at the instant (t) of the index I(t), the current value at the same instant (t) of an observation function E(t) is calculated, such that:

$$E(t)=I(t)-\bar{I}(t\pm\alpha t)$$

where $\bar{I}(t\pm\Delta t)$ is an estimated value of the index I (t) at an instant (t±Δt) different from (t), c) the current value of E(t) is compared with a predetermined threshold (S) dependent on the engine load (C) and/or speed (N), and d) a misfire is diagnosed when the value of E(t) exceeds the threshold (S).

10 Claims, 1 Drawing Sheet

U.S. PATENT DOCUMENTS

| | | |
|---|---|---|
| 6,082,188 A | 7/2000 | Angermaier et al. |
| 6,584,834 B1 * | 7/2003 | Lehner et al. ................. 73/116 |
| 6,651,490 B1 * | 11/2003 | Ceccarani et al. .......... 73/117.3 |
| 7,072,760 B2 * | 7/2006 | Rossignol .................... 701/111 |

FOREIGN PATENT DOCUMENTS

| | | |
|---|---|---|
| FR | 2 689 934 | 10/1993 |
| FR | 2 718 489 | 10/1995 |

* cited by examiner

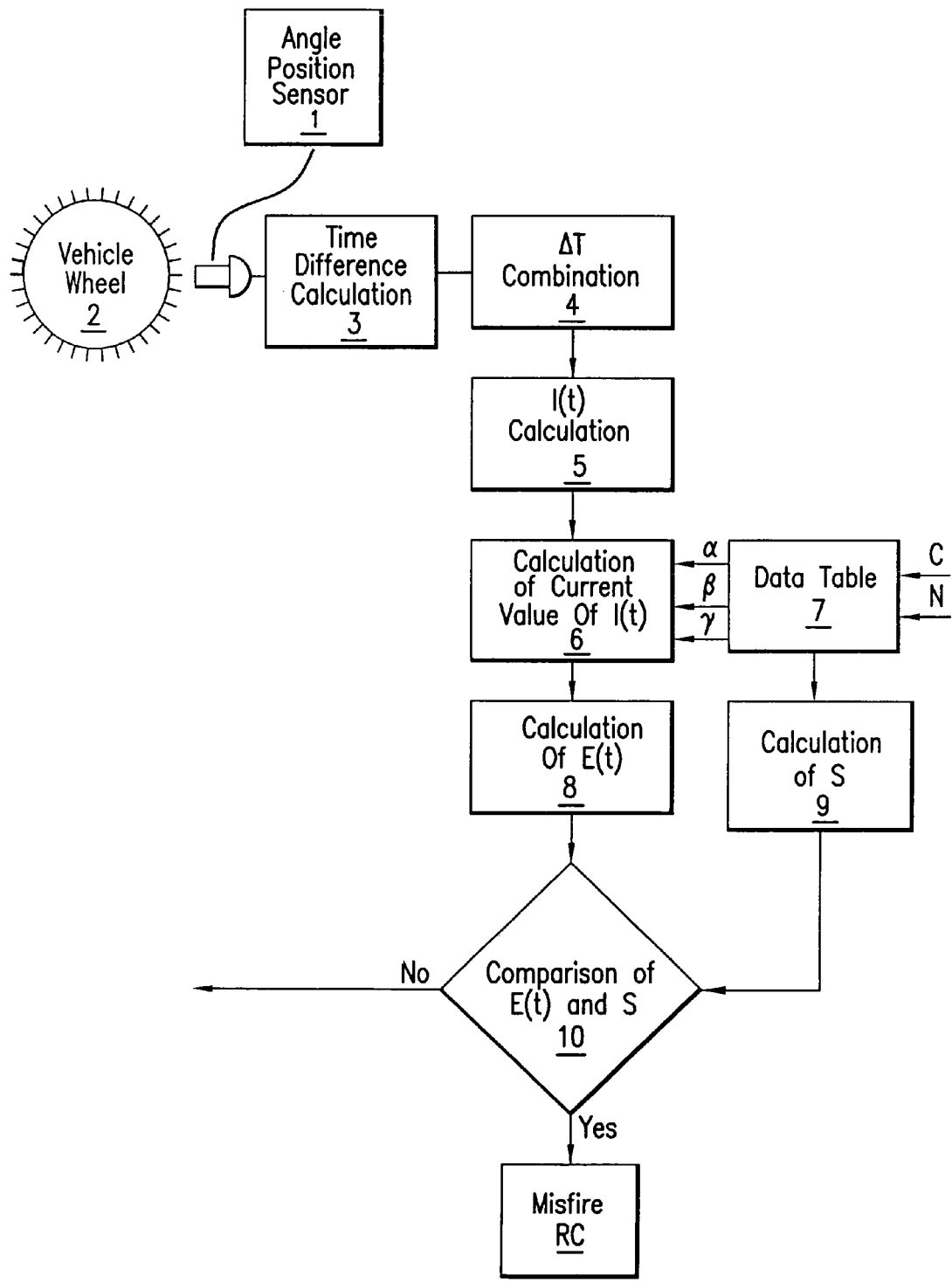

METHOD FOR DETECTING FAILED COMBUSTION IN AN INTERNAL COMBUSTION ENGINE BY A COMBINATION OF COMBUSTION IRREGULARITY INDICES

CROSS REFERENCE TO RELATED APPLICATIONS

This application is the 35 USC 371 National Stage of International Application PCT/EP2004/001249 filed on Feb. 11, 2004, which designated the United States of America.

FIELD OF THE INVENTION

The present invention relates to a method for detecting misfires (or partial combustion) of an air/fuel mixture in the cylinders of an internal combustion engine, particularly an engine propelling a motor vehicle, this method making provision for an index representative of engine operating irregularities to be calculated, preferably during each combustion phase of this mixture in any one of the engine cylinders.

BACKGROUND OF THE INVENTION

Combustion irregularities in an internal combustion engine are useful to diagnose because they point to various disorders likely to affect the operation of the engine.

Patent FR-A-2 689 934 discloses such a method intended more particularly for such diagnostics when an engine is operating at medium and high speed. According to this method, during each combustion phase in any one of the cylinders, collections of time differences $\Delta t_r$ separating predetermined angular positions of the crankshaft are measured, and then, using a linear combination of the time differences from the set, a "critical parameter" or "index" representative of the variations in the rotational speed of the engine (crankshaft) during this combustion phase is calculated and this index is compared with a default threshold in order to diagnose whether a misfire is occurring.

FR-A-2 718 489 also discloses a method of the type described in FR-A-2 689 934, but improved in such a way as to eliminate disturbances of the diagnostics by variations in the geometry of a "target" used to measure the aforementioned time differences.

Methods of the same type, modified in such a way as to prevent a "backup" of forces, resulting from a vehicle propelled by the engine being driven over a surface of irregular geometry from disturbing the diagnostics, and to do so without using a sensor dedicated to detecting such forces are also known.

The solutions hitherto proposed do, despite everything, have disadvantages which constitute a limitation that it is difficult to accept in the context of a function discerning poor combustion in an engine.

First of all, if the use of an index representative of the variations in the rotation speed of the engine during the combustion phases is in fact appropriate, the parameter best suited to detecting misfires at high engine speeds proves to be sensitive to high-amplitude fluctuations, noise and jolts transmitted typically to the crankshaft through the drive line when a vehicle is in everyday use.

These disturbances may typically be the result of clutch jolts or of driving over a poor road surface. This may in any case lead to an inappropriate discerning of misfires, depending on the intensity of the disturbances, especially at low engine speeds.

Conversely, a parameter that proves to be well suited to detection at low engine speeds is not very sensitive to these high-amplitude fluctuations but does itself have low sensitivity to the speed variations characteristic of an absence of combustion at high speed.

That being the case, the selecting of one parameter from among several according to the conditions of use of the engine, that is to say in "everyday" use, has already been envisaged. However, in this case, each time these conditions of use are altered, a sequence of reinitializing the diagnostics method is needed and may lead to this method being temporarily disabled. The proliferation of these operating/reinitializing sequences around an engine speed or load threshold, when there is a fluctuation or a transient load situation may also interrupt the diagnostics for a relatively long length of time.

Furthermore, the possible use of hysteresis limits the possibilities of practical embodiment of the system and makes calibration complicated.

It may also be noted that the "critical parameters" or "indices" of the methods of the prior art mentioned hereinabove, and the detection algorithms that use them, prove to be effective only under certain engine load and speed conditions and/or only for certain types of combustion fault. Specifically, in this regard, it is possible to draw a distinction between erratic misfires, systematic misfires (affecting one and the same cylinder for example) and various sequences of misfires affecting different cylinders, for example.

Attempts may be made at alleviating these disadvantages by proliferating the diagnostic processes, each process being tailored to a particular engine operating domain, or to filtering out one particular cause of disturbance of the diagnostics.

However, this approach is cumbersome and expensive, both in terms of process development time for these diagnostic processes and in terms of computation time, when executing these complex processes.

SUMMARY OF THE INVENTION

It is therefore an object of the present invention to provide a method for detecting misfires which does not suffer from the shortcomings mentioned hereinabove and which, in particular, provides "universal" detection of combustion defects, irrespective of the engine operating domain or the type of misfire to be diagnosed, or alternatively irrespective of the causes likely to disturb the diagnostics that are to be carried out.

In the context of the invention, at least some of the objects mentioned hereinabove are achieved by using a method in which:

a) during at least some of the phases of combustion in at least one of the cylinders, a current value, at an instant (t) of operation of the engine, of an index I(t) representative of operational irregularities in the engine stroke is calculated, b) while the engine is operating, and on the basis of the current value, at the instant (t) of the index I(t), the current value at the same instant (t) of an observation function E(t) is calculated, such that:

$$E(t)=I(t)-\bar{I}(t\pm\Delta t)$$

where $\bar{I}(t\pm\Delta t)$ is a filtered estimated value of the index I(t) at an instant $(t\pm\Delta t)$ different from (t), c) the current value of E(t) is compared with a predetermined threshold (S) dependent on the engine operating point (C, N), and d) a misfire is diagnosed when the value of E(t) exceeds the threshold (S)

with the additional particular feature that the index I(t) is calculated from a linear combination of at least two elemental indices ($I_1$, $I_2$, $I_3$) each representative of operational irregularities of the engine in a predetermined engine operating domain ($\Delta C$, $\Delta N$), the elemental indices ($I_1$, $I_2$, $I_3$) being weighted, in the combination, with predetermined relevance coefficients ($\alpha$, $\beta$, $\gamma$) obtained in more or less identical operating conditions on a bench-tested reference engine.

Furthermore, preferably in conjunction with the foregoing characteristic, another characteristic of the invention advises that the elemental indices ($I_1$, $I_2$, $I_3$) each be tailored to increase the signal-noise ratio of the engine operating irregularities detection in the operating domain ($\Delta C$, $\Delta N$) associated with it.

According to yet another characteristic, it is advisable that the relevance coefficients ($\alpha$, $\beta$, $\gamma$) be tabulated as a function of the engine speed (N) and load (C).

Thus, two elements characteristic of the operation of the engine (its speed and its load) which are particularly illustrative of the actual driving conditions encountered by the user of the vehicle, are taken directly into consideration to reveal any combustion defects there might be.

As far as the type of processing (calculation) performed in relation to the index I(t) is concerned, it will preferably be noted that:

the estimated value of $\bar{I}(t\pm\Delta t)$ is a value filtered in an electronic data filter, and/or the estimated value of $\bar{I}(t\pm\Delta t)$ is an averaged value corresponding to the mean value of several current values of I(t) at several instants different from the instant (t) for calculating the index I(t), any values too far from the expected value being either sorted or weighted so that they do not affect the mean.

In relation with the moments at which the readings prior to measuring the index are taken, it is advisable for the values of I(t) and $\bar{I}(t\pm\Delta t)$ calculated to correspond to operating instants (t) and ($t\pm\Delta t$) belonging to one and the same engine operating cycle, or to cycles less than five consecutive cycles apart. Thus, the detection reliability will be improved.

The value of five cycles is given for a four-cylinder engine and corresponds to 720° crank angle. For a different engine architecture, the optimum number of cycles will be established bearing this comment in mind.

It will be noted that in this description, the term "cycle" corresponds to the space of time separating two active top dead centers (ATDC) of a cylinder, an "active top dead center" corresponding to the angular position of the crankshaft which precedes the expansion of the gases, namely the minimum distance between the piston and the top of the cylinder head of this engine.

BRIEF DESCRIPTION OF THE DRAWINGS

An even more detailed description of the invention will now be provided with reference to the attached FIGURE which is a flow diagram schematically setting out one exemplary embodiment of a detection method according to the invention.

DETAILED DESCRIPTION OF THE INVENTION

In this FIGURE, it can be seen that the method according to the invention makes use of the signals conventionally delivered by a position sensor 1, of the magnetic reluctance type for example, sensitive to the passage of the teeth of a toothed wheel 2, or target, fixed on the output shaft of an internal combustion engine (not depicted).

The angular position sensor 1 is thus firmly secured to a fixed part of the engine facing the wheel 2 which is therefore secured to the crankshaft. Typically, the wheel bears a series of uniformly spaced identical teeth and one individual tooth (for example of a width equal to the width of three ordinary teeth), the absolute position of which is perfectly known with respect to the crankshaft. This sensor delivers a signal Sc containing, for each revolution of the crankshaft, data about the angular position corresponding to the passing of each ordinary tooth and an absolute position information item corresponding to the passing of the individual tooth. This data may consist in a series of pulses, after shaping in electronic processing means associated with the sensor. The absolute position data allow the position of the active top dead centers to be determined. A counter receives the signal Sc and delivers the time difference values $\Delta t_1$, $\Delta t_2$, ... by measuring the times separating the passings of predetermined teeth past the sensor. These time differences are logged in a memory of the computer provided on board the vehicle and processed by this computer. These calculation means are programmed to group the time difference values together into collections of samples $\Delta t_1$, $\Delta t_2$, etc. from which the critical parameter is calculated.

Thus, having been shaped, the signals delivered by the sensor 1 are used in step 3 to calculate this critical parameter, or index, representative of the engine operating irregularities, which therefore result, in particular, from misfires. In fact, this index is representative of variations in the instantaneous rotational speed of the engine at the chosen instant in the cycle (typically combustion), that is to say at a reference instant in the combustion phase, preferably with respect to the mean speed between two consecutive active top dead centers.

The calculated index adopts the form of a linear combination of time differences $\Delta t_1$ (acquired at step 4) separating predetermined angular positions of the engine crankshaft recorded by virtue of the signal delivered by the sensor 1, preferably during the same combustion phase of the engine, or consecutive phases.

The index may for example correspond to an estimated value of the engine torque at the instant considered, particularly during combustion (such as ATDC), in a given cycle.

Thus, during step 4 and in each sampling window, a series of time difference measurements, for example angularly distributed about a reference position, is taken with a view to obtaining the aforementioned set of samples $\Delta t_1$ over said window, after which, for each set of samples, a linear combination of these measured $\Delta t_1$ values is determined, so as to obtain the relevant index.

As in the aforementioned French patent FR-A-2 689 934, this linear combination $I_i$ may be expressed by the relationship:

$$I_i(t)=-\Delta t_1-3\Delta t_2-2\Delta t_3+2\Delta t_4+3\Delta t_5+\Delta t_6 \text{ (with } i=1, 2, \ldots n)$$

possibly weighted by a factor $1/t^3$ where t is a parameter proportional to the time it takes for the wheel 2 to rotate.

Thus, preferably for each cycle or for a selected series of cycles, a specific instant in the combustion is monitored, determining, by simple linear combinations, a parameter representative of the variations in the instantaneous speed at that instant.

According to the present invention, by way of an index I(t) representative of the engine operating irregularities, use is made of a linear combination of at least two indices, for example "elemental" indices $I_i(t)$ such as $I_1(t)$, $I_2(t)$, $I_3(t)$, each tailored to a particular engine operating domain defined by particular ranges of variation $\Delta C$ in the load C and $\Delta N$ in the speed N of this engine. This tailoring is aimed at maximizing the signal/noise ratio of the detection to be performed, in the engine operating domains associated with the respective indices $I_1(t)$, $I_2(t)$, $I_3(t)$.

For each elemental index, time differences separating predetermined angular positions of the rotating component secured to the crankshaft will therefore be measured, the corresponding elemental index then being calculated from these differences.

Such calculations, such as those mentioned elsewhere in this description, may be executed by the computer held on board the vehicle which manages the engine operation and is duly programmed for that purpose.

Thus, it is in step 5 of the flow diagram of FIG. 1, while the vehicle is in everyday use, that the various indices $I_1(t)$, $I_2(t)$, $I_3(t)$, . . . , each tailored to one of the engine operating domains are calculated, this tailoring being performed, for example, by selecting a particular series of weighting coefficients for the measured intervals $\Delta t$.

In step 6, according to an advantageous characteristic of the present invention, the current value I(t) of a "universal" index is calculated such that:

$$I(t)=\alpha I_1(t)+\beta I_2(t)+\gamma I_3(t)$$

where $\alpha$, $\beta$, $\gamma$ are "relevance" coefficients drawn from a memory unit (table) 7 where these coefficients are stored as a function of the engine load C and speed N. These coefficients are used, in the expression of I(t), to weight the associated indices according to the lesser or greater proximity of the actual engine operating point (C, N) to the operating domain ($\Delta C$, $\Delta N$) associated with each elemental index. In a known way, the load can be measured by any conventional means (intake manifold depression, air flow rate, etc.), while the engine speed can be recorded for each revolution of the engine using conventional means.

The values of the index I(t) calculated during the successive combustion phases initiated in the cylinders of the engine make it possible, according to an essential characteristic of the present invention, to calculate, in step 8, the value of an observation function E(t) such that:

$$E(t)=I(t)-\bar{I}(t\pm\Delta t)$$

where $\bar{I}(t\pm\Delta t)$ is a filtered estimated value of the index I(t) at an instant $(t\pm\Delta t)$ different from (t), and I(t) is the current value (the actual value at the instant t) of I, calculated in step 6. Thus, the function E(t) provides an instantaneous difference between two actual values (that is to say values which exist while the vehicle is operating, rather than being bench tested as during the step of producing the data contained in the table 7).

The population of the values taken into consideration incorporates a population with misfires and without misfires thus making it possible to obtain a true picture of the operation of the engine, while the vehicle is moving along.

The calculated values of I(t) and $\bar{I}(t\pm\Delta t)$ will preferably correspond to values existing at relatively closely spaced operating instants, that is to say instants preferably belonging to one and the same engine operating cycle (typically a four-stroke cycle), or to cycles at most five consecutive cycles apart, the FIGURE of five cycles having been chosen as illustrating this relative proximity in time between the values taken into consideration as much in order to avoid overloading the memory of the computer as to possibly avoid the system becoming erratic, given the evolutions in the operation of the engine.

The value of five cycles is given for a four-cylinder engine and corresponds to 720° crank angle. For a different engine architecture, the optimum number of cycles will be established bearing this comment in mind.

The type of processing performed on the values used for calculating the function E(t) from values that have been averaged and/or filtered in an appropriate electronic filter, depends in particular on the number of values that are to be taken into consideration and on the use that is to be made of the calculated value E(t).

If the number of values taken into consideration in calculating I(t) is high, it may be desirable to use an averaged value.

Using a filtered value may also make it possible to get around the problem of certain erratic data. It is possible in particular to eliminate said erratic values or alternatively to weight them in such a way as to render their influence negligible.

As indicated in the attached FIGURE, table 7 (the memory unit) therefore established on bench makes it possible for the computer on board the vehicle not only to calculate the index I(t) as explained hereinabove but also, to calculate in step 9 a threshold value S corresponding, like I(t), to a linear combination of at least two elemental indices $I_1$ and therefore such that:

$S=\alpha I_1+\beta I_2+\gamma I_3$ bearing in mind the example of linear combination adopted for I(t).

In this relationship, $\alpha$, $\beta$ and $\gamma$ are the aforementioned relevance coefficients, dependent on the engine load C and speed N during its bench tests, $I_1$, $I_2$, $I_3$ being three values of the index I established at different instants chosen during the operation of the engine during testing.

In step 10, the value of E(t) is compared with the threshold value S, which is therefore a direct function of the engine speed N and load C.

Bearing in mind the purpose of the invention, the threshold S will be established in such a way that an exceeding of its value by E(t) corresponds, at the instant of this exceeding, to a misfire (RC) occurring, and thus being diagnosed.

One or more default thresholds may be defined.

The memory unit 7 may, to begin with, contain a map of the thresholds, established on test bench, for various (each) engine speed(s) and load(s) in the operating range of this engine. This map may therefore have been defined beforehand by artificially provoking a combustion defect at predefined speeds and loads, taking the aforementioned time difference measurements ($\Delta t_f$) and calculating the corresponding critical index or indices, and also storing some of these indices in memory as default threshold(s).

Upon each cycle, while the vehicle is driving along normally (for example at each dead top center), the current engine speed and the mean current load applied are detected, and the corresponding default threshold is extracted from the memory unit 7 so that the abovementioned comparison can be made.

More specifically, after each calculation of the index I(t), the on-board calculation means, programmed to determine the engine speed and load from data received from the pulse counter associated with the sensor 1 and from an intake pressure sensor, for example, can extract from the memory of the table 7 the threshold that corresponds to that speed and load and compare the index with this threshold (step 10). If the threshold is exceeded, a fault information item may be delivered to alert means in order to instigate the action that needs to be taken (raise an alarm, perform an action on an injector, etc.).

In conclusion, it will be noted that the process of a linear combination of basic indices ($I_1$, $I_2$, $I_3$) correspondingly, at a given instant, to the operating status of the engine in terms of its speed N and its load C here make it possible:

- to reveal absences of combustion by choosing, for each operating point, the best index available through appropriate weighting,
- to ensure a gradual transition between the various choices of index, without disabling the diagnostics and without altering the detection calibration,
- and to limit the calculation burden through the linearity of the processing operations performed by the computer, including the adaptations particularly when there is a change in index.

It should also be noted that this method avoids an auxiliary sensor for describing the condition of the road surface, making it possible to guarantee detection in accordance with the current standards.

It also guarantees coverage of the diagnostics which may be continuous over time, even when the engine operating conditions require frequent changes in the sensitivity of the detection and in the indexes used for this.

The development time is also shortened, it being possible for each detection on the basis of the basic index selected to be calibrated once and for all for a fixed speed (during bench testing), independently of the definitive weighting associated with the dynamics of the operating vehicle.

The invention claimed is:

1. A method for detecting misfires of a mixture between a fuel and an oxidizing agent, in any one of the cylinders of an internal combustion engine, this method being characterized in that it comprises the following steps:
    a) during at least some of the phases of combustion in at least one of the cylinders, a current value, at an instant (t) of operation of the engine, of an index I(t) representative of operational irregularities in the engine stroke is calculated,
    b) while the engine is operating, and on the basis of the current value, at the instant (t) of the index I(t), the current value at the same instant (t) of an observation function E(t) is calculated, such that:

$$E(t)=I(t)-\bar{I}(t\pm\Delta t)$$

where $\bar{I}(t\pm\Delta t)$ is an estimated value of the index I(t) at an instant ($t\pm\Delta t$) different from (t),
    c) the current value of E(t) is compared with a predetermined threshold (S) dependent on the engine load (C) and/or speed (N), and
    d) a misfire is diagnosed when the value of E(t) exceeds the threshold (S)

the index I(t) being calculated from a linear combination of at least two elemental indices ($I_1$, $I_2$, $I_3$) each representative of operational irregularities of the engine in a predetermined engine operating domain ($\Delta C$, $\Delta N$), the elemental indices ($I_1$, $I_2$, $I_3$) being weighted, in the combination, with predetermined relevance coefficients ($\alpha$, $\beta$, $\gamma$) obtained in more or less identical operating conditions on a bench-tested reference engine.

2. The method as claimed in claim 1, characterized in that the relevance coefficients ($\alpha$, $\beta$, $\gamma$) are tabulated as a function of the engine speed (N) and load (C).

3. The method as claimed in claim 2, characterized in that the elemental indices ($I_1$, $I_2$, $I_3$) are each tailored to increase the signal-noise ratio of the engine operating irregularities detection in the operating domain ($\Delta C$, $\Delta N$) associated with it.

4. The method as claimed in claim 2, characterized in that the values of I(t) and of $\bar{I}(t\pm\Delta t)$ calculated correspond to operating instants (t) and ($t\pm\Delta t$) belonging to the same engine operating cycle, or to cycles less than 720° crank apart.

5. The method as claimed in claim 2, characterized in that the value of $\bar{I}(t\pm\Delta t)$ is a value filtered in an electronic data filter.

6. The method as claimed in claim 2, characterized in that the value of $I(t\pm\Delta t)$ is an averaged value corresponding to the mean value of several current values of I(t) at several instants different from the instant (t) for calculating the index I(t), these values being sorted or weighted in such a way that the values corresponding to combustion irregularities do not disturb the resultant value $\bar{I}(t\pm\Delta t)$.

7. The method as claimed in claim 1, characterized in that the elemental indices ($I_1$, $I_2$, $I_3$) are each tailored to increase the signal-noise ratio of the engine operating irregularities detection in the operating domain ($\Delta C$, $\Delta N$) associated with it.

8. The method as claimed in claim 1, characterized in that the values of I(t) and of $\bar{I}(t\pm\Delta t)$ calculated correspond to operating instants (t) and ($t\pm\Delta t$) belonging to the same engine operating cycle, or to cycles less than 72020 crank apart.

9. The method as claimed in claim 1, characterized in that the value of $\bar{I}(t\pm\Delta t)$ is a value filtered in an electronic data filter.

10. The method as claimed in claim 1, characterized in that the value of $I(t\pm\Delta t)$ is an averaged value corresponding to the mean value of several current values of I(t) at several instants different from the instant (t) for calculating the index I (t), these values being sorted or weighted in such a way that the values corresponding to combustion irregularities do not disturb the resultant value $\bar{I}(t\pm\Delta t)$.

* * * * *